Patented Mar. 20, 1951

2,545,780

UNITED STATES PATENT OFFICE 2,545,780

CYCLOALIPHATIC SILANES

David B. Hatcher and Raymond H. Bunnell, Toledo, Ohio, assignors to Libbey-Owens-Ford Glass Company, Toledo, Ohio, a corporation of Ohio No Drawing. Application August 9, 1948, Serial No. 43,354

6 Claims. (Cl. 260—448.2)

The invention relates to the production of novel organo-silicon compounds whose molecule includes two silicon atoms, one of which is attached to a carbon atom in the ring of an alkylated cycloalkane, and the other of which is attached to a carbon atom in the alkyl side chain of such alkylated cycloalkane, and to the production of useful compositions therefrom.

Silanes having a cycloaliphatic substituent in in the molecule have usually been prepared by means of a Grignard reaction. Except in a few cases cycloaliphatic Grignard reagents produce very low yields of the desired cycloaliphaticsilanes, because they are extremely prone to side reactions which interfere with the desired reaction and result in comparatively large yields of unwanted products.

Silanes having an alkyl chain as a substituent in the molecule have been available as products of reactions that result in comparatively large yields of the desired silanes, but such silanes tend to form volatile cyclic products upon hydrolysis; evaporation of the volatile materials tends to produce inferior condensation (or polymerization) products.

The principal object of the invention is the preparation of novel silanes, and the production of useful products from such silanes, the molecule of the novel silanes including a silicon atom attached to a carbon atom in the ring of an alkylated cycloalkane and a second silicon atom attached to a carbon atom in the alkyl side chain, and the silanes being obtainable in comparatively large yields from readily available and inexpensive starting materials. More specific objects and advantages are apparent from the accompanying description, which illustrates and discloses but is not intended to limit the scope of the invention.

Heretofore, it has not been known to be possible to produce a silane whose molecule includes two silicon atoms, one of which is attached to a carbon atom in the ring of an alkylated cycloalkane, and the other of which is attached to a carbon atom in the alkyl side chain. It has been found that certain silanes fitting that description can be produced, and that they possess many of the combined desirable characteristics of cycloaliphaticsilanes and alkylsilanes. Such silanes are particularly useful as modifying agents to improve the condensation products or silicones produced from conventional silanes.

United States Patent No. 2,258,218 discloses the production of curable organo-silicon compositions by the hydrolysis of a mixture of a methyltrichlorosilane, a dimethyldichlorosilane and a trimethylchlorosilane. Cohydrolysis, with such a mixture of methylchlorosilanes, of a silane embodying the invention results in substantially improved hydrolysis and condensation products.

The silanes embodying the invention have a specific combination of radicals in the molecule, in that they have the general formula

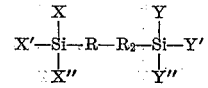

in which R is an alkylene radical having from 2 to 5 carbon atoms, $R_2$ is a cycloalkylene radical having from 5 to 12 carbon atoms, and each of the radicals X, X', X'', Y, Y', and Y'' is a hydrolyzable radical.

A silane of the invention consists of an alkylcycloalkane in the molecule of which two hydrogen atoms have been replaced by silicon atoms, each silicon atom being attached to three hydrolyzable radicals in addition to a carbon atom in the molecule. One of the silicon atoms is attached to a carbon atom in the cycloalkyl ring and the other is attached to a carbon atom in the alkyl side chain. Preferred silanes of the invention are those in which the alkylcycloalkyl radical is ethylcyclohexyl.

The cycloalkylene radical ($R_2$) can be a cycloalkylidene radical (i. e., the alkyl side chain and one silicon atom can be attached to the same carbon atom in the ring) but it is usually preferable that the side chain and the silicon atom be attached to different carbon atoms. $R_2$ may be a divalent radical which can be considered to be derived (by removal of two of the hydrogens attached to carbon atoms in the ring) from the molecules of cyclopentane, cyclohexane, an alkylated cyclopentane or an alkylated cyclohexane. When $R_2$ is such a radical that it can be considered to be derived from an alkylated cyclopentane or cyclohexane the alkyl radical or radicals may have from 1 to 6 carbon atoms and may be from one to three in number, but the total number of carbon atoms in the alkyl side chains should not exceed six. Thus, the alkyl side chain or chains can be from one to three methyls, from one to three ethyls, from one to two propyls or isopropyls, any butyl, any pentyl or any hexyl radical, or any combination of such radicals in which the total number of carbon atoms is six or less.

The alkylene radical (R) can be an alkylidene radical, but it is usually desirable that the cycloalkylene ring be attached to one carbon atom and the silicon atom to another. R may be a divalent radical which can be considered to be derived (by the removal of two hydrogens) from an alkane having from 2 to 5 carbon atoms. The alkane from which R can be considered to be derived can be ethane, propane, either butane or any pentane.

The preferred silanes of the invention are those in which R is ethylene and $R_2$ is not alkyl-substituted. Most desirably $R_2$ is cyclohexylene.

"Hydrolyzable radical" is used herein to include halogen, alkoxy, amino, aroxy and acyloxy. The halogen radical is any one having an atomic weight less than 100 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy or secondary butoxy). Amino is simply the —$NH_2$ group. Aroxy radicals are any in which the aryl group is phenyl, or a mono-, di- or trisubstituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or trimethyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

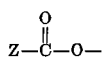

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described. The hydrolyzable radicals may be the same or different. The preferred hydrolyzable radical is a halogen radical, the most desirable being chloro.

The silanes of the invention are produced by means of a reaction between a trihalosilane, i. e., a compound that can be considered to be a derivative of silane ($SiH_4$) in which three halogen atoms have been substituted for hydrogens, and an alkenylcycloalkene. The three halogen atoms in the molecule of the trihalosilane can be the same or different and can be chloro, bromo or fluoro. The preferred trihalosilane is silicochloroform. The alkenylcycloalkene may be vinylcyclohexene-1, vinylcyclohexene-2, vinylcyclohexene-3, 1-ethyl-4-(2'-methyl-2'-propenyl)cyclohexene, 1,3-dimethyl-3-(2'-propenyl)cyclohexene, 4,4-dimethyl-2-(3'-methylbutenyl)cyclohexene, 1,2,2-trimethyl-3-vinylcyclopentene. Vinylcyclohexene-3 is preferred, being readily available as a by-product of the synthetic rubber industry formed by the addition polymerization of butadiene-1,3.

The reaction which produces the silanes of the invention (i. e., between a trihalosilane and an alkenylcycloalkene) proceeds readily at elevated temperature and pressure. The reaction is conducted either as a batch process (i. e., in a bomb) or as a continuous process (i. e., by conducting the alkenylcycloalkene and the trihalosilane into a reaction zone; removing the product from the reaction zone; and separating the reactants from the silane products), the continuous process being the preferred embodiment of the invention. The silane products from the reaction are separated by fractional distillation.

When the reaction is conducted as a batch operation the silicochloroform and alkenylcycloalkene are introduced at room temperature into a steel high pressure bomb. The bomb is sealed, placed in a heating jacket, and heated at a reasonably rapid rate to reaction temperature. (Usually the heating is effected by constant energy input so that the heating rate is rapid initially and gradually decreases until a maximum temperature is attained. A constant heating rate may be employed if desired, but close temperature control is not essential when the reaction is conducted batchwise.)

It is believed that the reaction which produces the silanes of the invention takes place slowly at temperatures as low as about 175° C. It is known that the rate of reaction increases with increases in temperature, and it is usually preferable, therefore, to conduct the reaction at a temperature materially above room temperature. Silanes of the invention are produced in substantial yields and in a reasonable time when the reaction temperature is as low as about 275° C., although it is usually preferable to conduct the reaction at a temperature of at least about 300° C. It is ordinarily advantageous that the bomb be heated at a comparatively rapid rate to the reaction temperature, a heating rate such that the temperature of the reactants is about 300° C. in from about 60 to about 90 minutes after heating is started is usually satisfactory. Somewhat faster heating rates may be practical, but the large mass of metal in the bomb ordinarily heats rather slowly. It is usually desirable that slower heating rates be avoided. It is ordinarily advisable not to heat the bomb above about 400° C., and preferable not to heat the bomb above about 375° C. Apparently, higher temperatures do not effect the products or the yield to a substantial extent, but the expenditure of extra energy required to conduct the reaction at a higher temperature is not warranted. For the same reason, it is usually most desirable that the reaction be conducted at a temperature not higher than about 350° C.

Because the reactants are gases at the reaction temperatures, it is usually desirable to conduct the reaction at superatmospheric pressure so that reasonable amounts of silanes of the invention can be prepared without the use of unduly large equipment. It has been found to be practical to conduct the reaction at a pressure as low as about 300 pounds per square inch gauge, but it is usually preferable to use a pressure of at least about 500 pounds per square inch gauge. Most desirably, the reaction is conducted at a pressure of at least about 700 pounds per square inch gauge. In some instances it may be desirable to conduct the reaction at a pressure as high as about 1500 pounds per square inch gauge, although it is usually preferable to use a pressure not higher than about 1200 pounds per square inch gauge. Most desirably the reaction is conducted at a pressure not greater than about 900 pounds per square inch gauge.

It is desirable in all instances to avoid the introduction of air, containing moisture, which hydrolyzes the silanes in the reactor to produce a hydrohalic acid.

Apparently, the reaction which takes place to produce the silanes of the invention is between two molecules of a trihalosilane and one molecule of the alkenylcycloalkene. The reaction which is believed to occur is represented in Equation 1, below (1)
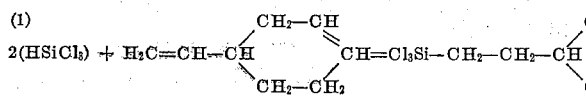  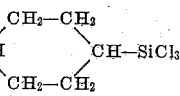

which shows the reaction of two molecules of silicochloroform with one molecule of vinylcyclohexene-3 to produce one molecule of 4-(2-trichlorosilylethyl) cyclohexyltrichlorosilane. It is known that the reaction produces (trichlorosilylethyl) cyclohexyltrichlorosilanes, and it is believed that a mixture is produced which consists in part of the 4-(2-trichlorosilylethyl) cyclohexyltrichlorosilane shown.

In some instances it may be desirable to use slightly less than the theoretical proportions of the trihalosilane with the alkenylcycloalkene, and it is usually desirable to use at least about 1 mol of the trihalosilane per mol of the alkenylcycloalkene, and preferable to use at least about 2 mols per mol of the alkenylcycloalkene. It is ordinarily most desirable to use at least about 2½ mols of the trihalosilane per mol of the alkenylcycloalkene. Usually it is desirable to use not more than about 3½ mols of the trihalosilane per mol of the alkenylcycloalkene, although much higher ratios can be used. Ordinarily, it is most desirable to use not more than about 3 mols of the trihalosilane per mole of the alkenylcycloalkene.

When a continuous reaction is used to produce the silanes of the invention, the temperature of the reaction zone should be controlled carefully so that reaction occurs to the desired extent in the time during which the reactants are present in the reaction zone. Thus the temperature of the reaction zone and the contact time that is used are interdependent; with a shorter contact time the reaction temperature should, in general, be higher. The same considerations that govern the operating temperature ranges when the reaction is conducted batch-wise govern the temperature ranges when the reaction is run continuously.

It is usually desirable to preheat the reactants so that they are introduced into the reaction zone at approximately the reaction temperature. By this procedure the material entering the reaction zone is already at reaction temperature, and it is only necessary to maintain that temperature. In this way the reaction zone is kept to a minimum size.

As noted above, the contact time that is used depends upon the operating temperature. Usually, it is desirable to use contact times not shorter than about 10 minutes, and preferable to use contact times not shorter than about 15 minutes. Ordinarily, it is most desirable to use contact times not shorter than about 20 minutes. Usually it is desirable to use contact times not longer than about 100 minutes, and preferable to use contact times not longer than about 90 minutes. Most desirably, contact times not longer than about 80 minutes are used.

The same considerations that govern the proportions of reactants and the pressure used when the reaction is conducted as a batch operation govern the proportions of reactants and the pressure used when the reaction is conducted as a continuous operation.

Such reaction produces only (trihalosilylalkyl)-cycloalkyltrihalosilanes. The (trihalosilylalkyl)-cycloalkyltrihalosilanes can be subjected to further reactions to produce other silylalkylcycloalkylsilanes. Thus, silylalkylcycloalkylsilanes having, attached to the silicon atoms, one or more amino radicals are produced by reaction between ammonia and an appropriate (halosilylalkyl)-cycloalkylhalosilane. By such a reaction a halogen atom is replaced by $NH_2$.

Silylalkylcycloalkylsilanes having, attached to the silicon atoms, hydrolyzable alkoxy radicals are produced by reaction between (halosilylalkyl)-cycloalkylhalosilanes and alcohols having the general formula S—OH in which S is methyl, ethyl, propyl, isopropyl, n-butyl, secondary butyl or isobutyl. Alkoxy is substituted for a halogen atoms by means of such a reaction, with corresponding formation of a hydrogen halide.

Silylalkylcycloalkylsilanes having, attached to the silicon atoms, hydrolyzable acyloxy groups are produced by reaction between an acid anhydride and the silanes having hydrolyzable radicals which consist of alkoxy groups, or, in some instances, by reaction between a (halosilylalkyl) cycloalkylhalosilane and the sodium salt of the organic acid.

Silylalkylcycloalkylsilanes having hydrolyzable aroxy radicals attached to the silicon atoms are prepared by reaction between the corresponding (halosilylalkyl) cycloalkylhalosilane and phenol or monoalkyl-, dialkyl- or trialkyl-substituted phenols in which each alkyl substituent has from one to five carbon atoms, and all the alkyl substituents contain a total of not more than five carbon atoms as hereinbefore described.

*Example*

A (silylalkyl) cycloalkylsilane is prepared according to the following procedure:

Silicochloroform (237 grams) and a diene (81 grams of vinylcyclohexene-3) are charged into a steel high pressure bomb having a capacity of about 1100 cc. and the bomb is sealed, placed in a heating jacket, and heated, using a constant energy input sufficient to achieve a temperature of 324° C. in about 80 minutes. The temperature inside the bomb is maintained between about 320° C. and about 340° C. for 90 minutes, after which time heating is discontinued; the bomb is allowed to cool; and the product is removed from the bomb and separated by fractional distillation through a jacketed column 36 inches in length and 25 mm. in diameter, packed with glass helices. A mixture of (trichlorosilylethyl) cyclohexyltrichlorosilanes (60 grams having a boiling temperature between about 153° C. and about 160° C. at an absolute pressure of about 4 mm. of mercury) is recovered from the reaction products.

Similar results are obtained if in the foregoing procedure the vinyl cyclohexene-3 is replaced by an equivalent amount of 1-ethyl-4-(2'-methyl-2' - propenyl) cyclohexene, 1,3 - dimethyl - 3 - (2' - propenyl) cyclohexene, 4,4 - dimethyl - 2 - (3' - methylbutenyl) cyclohexene, or 1,2,2 - tri - methyl-3-vinylcyclopentene.

Having described the invention, we claim:

1. An organo-silicon compound having the general formula

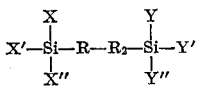

in which R is an alkylene radical having from 2 to 5 carbon atoms, $R_2$ is a cycloalkylene radical having from 5 to 12 carbon atoms, consisting of a cycloaliphatic nucleus having from 5 to 6 carbon atoms, and having not more than 3 alkyl side chains containing a total of not more than 6 carbon atoms, and each of the radicals X, X', X'', Y, Y' and Y'' is a hydrolyzable radical.

2. An organo-silicon compound as claimed in claim 1 in which R is ethylene and $R_2$ is cyclohexylene.

3. An organo-silicon compound as claimed in claim 2 in which each of the hydrolyzable radicals is a halogen atom.

4. An organo-silicon compound as claimed in claim 3 in which each of the hydrolyzable radicals is chloro, the two free valences of R are from different carbon atoms, and the two free valances of $R_2$ are from different carbon atoms.

5. A (trichlorosilylethyl) cyclohexyltrichloro-silane.

6. An organo-silicon compound having the general formula

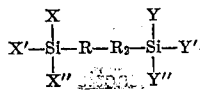

in which R is an alkylene radical having from 2 to 5 carbon atoms, $R_2$ is a cycloalkylene radical having from 5 to 12 carbon atoms consisting of a cycloaliphatic nucleus having from 5 to 6 carbon atoms, and having not more than 3 alkyl side chains containing a total of not more than 6 carbon atoms, and each of the radicals X, X', X'', Y, Y' and Y'' is a radical of the class consisting of halogen, alkoxy, amino, aroxy and acyloxy radicals.

DAVID B. HATCHER.
RAYMOND H. BUNNELL.

REFERENCES CITED

The following references are of record in the file of this patent:

UNITED STATES PATENTS

| Number | Name | Date |
|---|---|---|
| 2,379,821 | Miller | July 3, 1945 |

OTHER REFERENCES

Sommer et al.: "Jour. Am. Chem. Soc.," vol. 69 (1947), page 188.

Burkhard et al.: "Jour. Am. Chem. Soc.," vol. 69 (1947), pages 2687–2689.

Pietrusza et al.: "Jour. Am. Chem. Soc.," vol. 70 (1948), pages 484–486.

Barry et al.: "Jour. Am. Chem. Soc.," vol. 69 (1947), page 2916.